United States Patent [19]

Arbjerg et al.

[11] Patent Number: 5,165,447

[45] Date of Patent: Nov. 24, 1992

[54] FULLY-HYDRAULIC STEERING UNIT

[75] Inventors: Niels Arbjerg, Sydals; Steffen Lorentzen, Nordborg, both of Denmark

[73] Assignee: Danfoss A/S, Nordborg, Denmark

[21] Appl. No.: 844,793

[22] Filed: Mar. 2, 1992

[30] Foreign Application Priority Data

Mar. 9, 1991 [DE] Fed. Rep. of Germany ....... 4107604

[51] Int. Cl.$^5$ ............................................. B62D 5/083
[52] U.S. Cl. .................................. 137/625.22; 91/375; 137/625.23
[58] Field of Search ....................... 137/625.21, 625.22, 137/625.23, 625.24; 91/375, 375 A

[56] References Cited

U.S. PATENT DOCUMENTS 3,819,307  6/1973  Uppal .................. 137/625.24 X
4,804,016  2/1989  Novacek et al. ......... 137/625.23 X Primary Examiner—Alan Cohan
Attorney, Agent, or Firm—Wayne B. Easton

[57] ABSTRACT

In a hydraulic power steering control unit of the type having an inner steering wheel operated control member which has limited relative rotation movement with respect to outer control member which controls a conventional steering motor, passages are provided in these members to control the pressures therebetween to prevent jamming thereof.

6 Claims, 1 Drawing Sheet

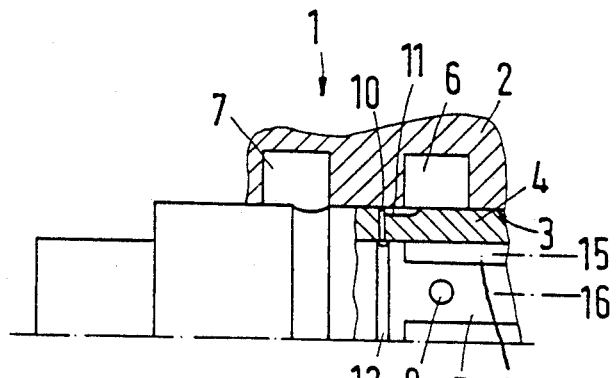
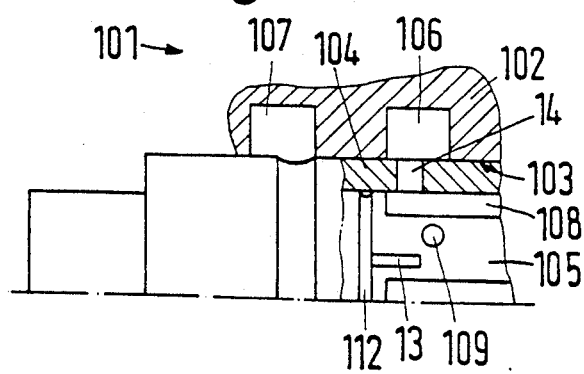
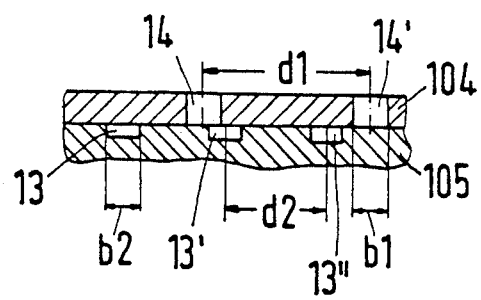
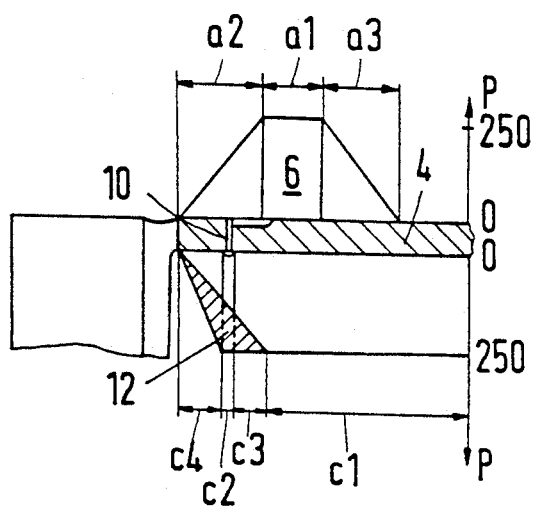
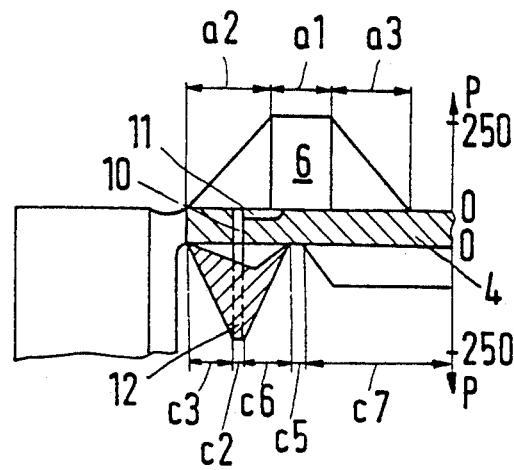

FULLY-HYDRAULIC STEERING UNIT

The invention relates to a fully-hydraulic steering unit with a housing, which has an internal bore in which there are arranged four circumferential channels, namely a pump channel, a tank channel, a first control channel and a second control channel, which are connected in that order with a pump connection, a tank connection, a first control connection and a second control connection, with an outer sliding member rotatably mounted in the internal bore, the sliding member having corresponding openings for each circumferential channel, namely pump openings, tank openings, first control openings and second control openings, with an inner sliding member rotatably mounted in an axial internal bore of the outer sliding member, the inner sliding member having servo openings and tank bores which upon rotation of the inner sliding member relative to the outer sliding member, depending on direction, come into register at least partially with the first or second or with the second or first control openings, and with a pressure slot extending in the circumferential direction for receiving a fluid producing a pressure between the inner sliding member and the outer sliding member.

A steering unit of this kind is known from U.S. Pat. No. 3,819,307. When the inner sliding member is displaced relative to the outer sliding member by rotating a steering handwheel, fluid, which is pressurized by a pump, passes from the housing through the outer sliding member to the inner sliding member and from there through the outer sliding member to the metering motor. From the metering motor the liquid is returned through the servo openings of the inner sliding member and through the outer sliding member and from there, depending on the desired direction, either through the first control openings to the steering cylinder in order to effect a deflection of the steering cylinder in one direction, or through the second control openings to the steering cylinder in order to effect deflection of the steering cylinder in the other direction. The fluid displaced in the steering cylinder is then passed through the second control opening or the first control opening into the tank bores of the inner sliding member, through the tank openings of the outer sliding member and the tank channel to the tank connection. When the steering motor has been displaced, but the outer sliding member and the inner sliding member have assumed their neutral position relative to one another, there is a risk that the outer sliding member will become jammed around the inner sliding member by the fluid that is enclosed in the steering motor under high pressure. This problem is overcome in the known steering unit with the help of two pressure slots in the form of annular channels around the right-hand control opening, which is connected to the servo opening on the inner sliding member. The pressure in the pressure slots then acts from the inside on the outer sliding member and thereby prevents the outer sliding member being able to jam on the inner sliding member in the region of the right-hand control opening. Nevertheless, in the known steering unit the pressure in the pressure slots remains constant, regardless of whether a pressure is in fact acting externally on the outer sliding member. The consequence of that is that there is a danger of friction between the outer sliding member and the housing, which ultimately has the same adverse effect, since the driver has to apply an increased torque in order to operate the steering.

The known steering arrangement has the disadvantage that it is able to prevent the outer sliding member from jamming on the inner sliding member only when a displacement has taken place. Through lateral stresses on the wheels, for example, in the case of building site vehicles, owing to uneven ground, even in the neutral position, that is, in the undisplaced position of the wheels, pressures may occur in the control openings which press the outer sliding member onto the inner sliding member and are thus able to lead to the outer sliding member and the inner sliding member becoming jammed together.

U.S. Pat. No. 4,804,016 discloses a further steering unit in which jamming between the outer and the inner sliding members during the displacement of the steering cylinder is intended to be avoided. This is effected in that, after a displacement, in the relative neutral position of the inner sliding member and outer sliding member, the fluid is passed through a bore in the outer sliding member and distributed over the servo openings on the inner sliding member. This generates a pressure from the inside against the outer sliding member, as a result of which the outer sliding member is no longer able to jam on the inner sliding member. The pressure on the inside of the outer sliding member is, however, relatively slight. In the case of a deflection towards the end position, where the relative rotation between the inner and the outer sliding members is greatest, and where additionally there is maximum counterpressure, a uniform pressure distribution over the circumference cannot, however, be guaranteed. In particular, it may happen that the pressure is unable to spread uniformly into all the depressions on the inner sliding member provided for that purpose. If jamming occurs in that situation, for example because of an increased counterpressure, the inner and outer sliding members are no longer automatically returned into their neutral position. In that case the operator must try to bring the sliding assembly back into the neutral position again using a jerky movement of the steering handwheel.

The invention is based on the problem of avoiding a jamming of the outer sliding member in all situations.

This problem is solved in a steering arrangement according to the preamble of claim 1 in that the pressure slot is permanently in connection with a control connection by way of an open fluid path.

The control connection can be either the first control connection or the second control connection. Because this manner of solving the problem is applicable to both control connections, reference will be made hereinafter merely to the "control connection". The fluid path provides a permanent connection between the pressure slot and the relevant control connection so that all pressure impulses that act on the control connection are also passed into the pressure slot. A pressure which acts from the outside by way of the control connection on the outer sliding member thus acts simultaneously from the inside on the outer sliding member by way of the pressure slot. An equilibrium is thereby produced which prevents the outer sliding member from becoming jammed on the inner sliding member. On the other hand, it is also impossible for a pressure to build up in the pressure channel without a corresponding pressure on the outside of the outer sliding member. The outer sliding member is therefore also unable to jam in the housing. For generation of the pressure in the pressure slot it is not necessary for the inner sliding member and the outer sliding member to have rotated relative to one another. Thus, even in the neutral position of the inner sliding member relative to the outer sliding member, and in the neutral position of the steering motor, a jamming of the outer sliding member on the inner sliding member or in the housing is effectively prevented.

In a preferred embodiment, the pressure slot has except for a fluid inlet no exit for fluid. It is therefore impossible for a flow to occur through the pressure slot so that once the pressure slot has been filled, the pressure from the control opening acts in the pressure slot with virtually no throttle losses.

The outer sliding member advantageously has a bore opening into the pressure slot, which bore is connected to an axial channel on the outside of the outer sliding member at least partially overlying the corresponding control channel. Because the control channel extends over the entire inner circumference of the bore in the housing, the bore is permanently connected by way of the axial channel to the corresponding control connection. An open fluid path between the control connection and the pressure slot is thus guaranteed.

In a further preferred embodiment, an axial channel opening into the pressure slot can also be provided on the inside of the outer sliding member, and is connected to one of the corresponding control openings. In that case, the pressure from the control channel propagates by way of the corresponding control opening and the axial channel on the inside of the outer sliding member into the pressure slot. This axial channel can be provided as an alternative to or in addition to the axial channel on the outside of the outer sliding member.

In a further alternative embodiment, which can be used instead of or in addition to the above-mentioned possibilities, provision is made for at least one axial channel opening into the pressure slot to be provided on the outside of the inner sliding member, which axial channel opens into the corresponding control opening. In this case too, the fluid path from the corresponding control connection into the pressure slot is guided through the corresponding control opening. Because the control opening is permanently connected by way of the control channel to the control connection, however, there is also no obstacle to propagation of the pressure into the pressure slot.

Advantageously, provision is made for the number of axial channels on the inner sliding member to be different from the number of control openings in the outer sliding member, and for the axial channels on the inner sliding member and the control openings on the outer sliding member to be so arranged that in every angular position at least one axial channel and at least one control opening overlie one another at least partially. In every possible angular position which the inner sliding member and the outer sliding member are able to assume in relation to one another, there is thus a guarantee that the pressure slot will be connected to the control connection by way of the axial channels on the outside of the inner sliding member and of the control opening and also of the control channel. When the axial channels are suitably distributed on the inner sliding member and the control openings are suitably distributed on the outer sliding member, a continuous connection can be produced between the pressure slot and the control connection by way of a changing path.

This can be effected, for example, in that the angular distance between two control openings is greater than the difference between, or is smaller than the sum of the angular distance between, two adjacent axial channels on the inner sliding member and the sum of the angular lengths of axial channel and control opening. In that case, as soon as one axial channel no longer overlies the control opening, it is guaranteed that the next axial channel already overlies the next control opening. Because the relative movement between inner sliding member and outer sliding member is generally restricted to just a few angular degrees, the expenditure required for this is not excessive. For example, it is sufficient to provide two, three or four axial channels and three, four or five control openings, which will form the fluid path.

Advantageously, the pressure slot is provided on the outer circumference of the inner sliding member. Alternatively, or in addition thereto, the pressure slot can be provided on the internal circumference of the outer sliding member. What is important is that a pressure can be built up in the pressure slot which is capable of counteracting a pressure acting from the outside on the outer sliding member.

Although in many cases it may be sufficient to provide one pressure slot for one control opening, because, generally speaking, the problem of jamming occurs only in one steering direction, a pressure slot can be provided both for the first and for the second control channel. In that case, jamming of the outer sliding member and inner sliding member is reliably prevented for both steering directions.

The invention is described hereinafter with reference to preferred embodiments in conjunction with the drawing, in which FIG. 1 is a fragmentary view of a steering arrangement, FIG. 2 is a fragmentary view of a steering arrangement of a modified embodiment, FIG. 3 is a diagrammatic illustration of the distribution of axial channels and control openings, FIG. 4 shows the pressure distribution in an axial direction in the region of a servo opening, and FIG. 5 shows the pressure distribution in an axial direction in the region between two servo openings.

A fully-hydraulic steering arrangement 1 has a housing 2 with an internal bore 3 in which an outer sliding member 4 is rotatably mounted. The outer sliding member 4 is in the form of a sleeve in which an inner sliding member 5 is mounted. The inner sliding member 5 is rotatable relative to the outer sliding member 4 to a certain angular extent. Since hydraulic steering arrangements of this kind are known, see for example U.S. Pat. No. 3,819,307 or U.S. Pat. No. 4,804,016, only that part of the steering are essential to the understanding of the invention is illustrated here. The housing 2 has been cut away completely, the outer sliding member 4 has been partially cut away and the inner sliding member 5 is shown intact.

A steering arrangement of this kind has a pump connection, a tank connection, a first control connection and a second control connection, none of which is illustrated. The first control connection serves, for example, to pressurize a connected steering cylinder so that it is displaced to the left, and on pressurization of the second control connection the steering cylinder can be displaced to the right. The hydraulic fluid displaced in the first case from the steering cylinder is then fed through the second control connection back into the steering arrangement. In the other case, the hydraulic fluid displaced from the steering cylinder is fed through the first control connection back into the steering arrangement. The hydraulic fluid is then able to flow by way of a tank connection back to the tank. Each of the connections is in connection with a respective channel provided in the internal bore 3 of the housing 2, namely, the pump connection with a pump channel, the first control connection with a first control channel, the second control connection with a second control channel and the tank connection with a tank channel. A control channel 6 and a tank channel 7 are illustrated. The control channel 6 can be the first control channel or the second control channel. The features illustrated apply to both control channels.

To control the hydraulic fluid flowing through the steering arrangement to the steering cylinder, servo openings 8 and tank bores 9 are provided in the inner sliding member 4. The servo openings 8 are here in the form of slots. The tank bores can also be of any shape instead of circular; for example, they may also be in the form of a slot. Depending on the direction of the relative movement between the outer sliding member 4 and the inner sliding member 5, when a relative movement occurs the servo openings 8 are brought into register with first control openings and the tank bores 9 are brought into register with second control openings. On rotation in the other direction, this is reversed.

In the outer sliding member 4, there is provided a bore 10 which is permanently in connection by way of an axial channel 11 with the control groove 6 in the housing 2. In the inner sliding member there is provided a pressure slot 12 in the form of a circumferential groove which is arranged in the axial direction at the same location as the bore 10. Thus, in every position of the inner sliding member 5 and of the outer sliding member 4 the pressure in the pressure slot 12 is the same as in the control channel 6. When the control channel 6 is in connection with the servo opening 8, that is, pump pressure passes into the control groove 6, this pump pressure also passes into the pressure channel 12. The outer sliding member 4 is therefore uniformly loaded with pressure from the inside and from the outside, and only axially-displaced pressure peaks can be observed. However, this cannot lead to a jamming of the outer sliding member 4 on the inner sliding member 5 or to a jamming of the outer sliding member 4 in the internal bore 3 of the housing 2. When there is no pressure in the control channel 6, for example because the control channel 6 is connected by way of the tank bore 9 to the tank channel 7, the pressure in the pressure slot 12 is also only tank pressure, so that no additional pressure is able to act from the inside on the outer sliding member.

FIG. 2 shows a further form of embodiment, in which parts that correspond to those of FIG. 1 are provided with reference numbers increased by 100.

In contrast to the form of embodiment according to FIG. 1, the pressure slot 112 is now no longer in connection with the control channel 106 by way of a specially provided bore, but by way of a control opening 14 already provided in the outer sliding member 104. Because the control opening 14 is displaced in the axial direction with respect to the pressure slot 112, the pressure slot 112 is connected with an axial channel 13 on the inner sliding member 105, the axial channel 13 extending in the axial direction until it is able to overlie the control opening 14.

Because the relative movement between the inner sliding member 105 and the outer sliding member 104 is generally restricted to a certain angular range, it may be sufficient to provide a single axial channel if the width of the control opening 14 and the axial channel 13 in the circumferential direction is sufficient. In that case, the axial channel 13 can be guaranteed to overlie the control opening 14 in all permissible angular positions between the inner rotor 105 and the outer rotor 104. If this is not possible, according to FIG. 3 provision can be made for several axial channels 13, 13' and 13" to be arranged on the inner sliding member 105, the spacing of which, that is to say their centre-to-centre distance, is d2. In the outer sliding member 104 there are in any case generally several control openings 14, 14', the spacing of which is d1. The distances d1 and d2 are selected so that at least one of the axial channels 13, 13' and 13," overlies at least One of the control openings 14, 14'. If, for example, the inner sliding member 105 is moved relative to the outer sliding member 104 to the right in FIG. 3, the axial channel 13" overlies the control opening 14' shortly before the axial channel 13' disengages from the control opening 14. This ensures that in every possible angular position there is a connection between the control channel 106 and the control channel 112. The distances can be selected, for example, so that the distance d1 is smaller than the sum of the distance d2 and the widths b1 of the axial control opening 14 and b2 of the axial channel 13, but larger than the distance d2. In that case, the condition that regardless of the angular position of the inner rotor 105 and outer rotor 104 relative to one another, there is always at least one control opening 14 overlying at least one axial channel 13, is fulfilled. Of course, the ratios can also be reversed, that is to say, more control openings can be provided on the outer sliding member 104 than axial channels 13 on the inner sliding member 105. In that case the distances would have to be correspondingly reversed.

FIG. 4 shows the pressure distribution on the outer sliding member 4 approximately in the region of the line 15 of FIG. 1. In this instance it is assumed that the control channel 6 is in pressure connection with the servo opening 8. The pressure on the outside of the outer sliding member 4 is applied upwardly and the pressure on the inside of the outer sliding member is applied downwardly. The pump pressure of, for example, 250 bars is effective on the outside of the outer sliding member 4 in a region a1. This pressure is constant across the width of the control channel 6. In a region a2, which is arranged to the left of and next to the region a1, and in a region a3, which adjoins the region a1 to the right, the pressure drops to zero. The region a2 is defined on the left by the tank channel 7. The pump pressure of, for example, 250 bars also acts on the inside of the outer sliding member in a region c1, since the pressure in the servo opening 8 is also the pump pressure. The full pump pressure is also effective in a region c2, since this pump pressure passes by way of the control channel 6, the axial channel 11 on the outside of the outer sliding member 4 and the bore 10 into the pressure slot 12. In a region c3 between the regions c2 and c1, the pressure dropping to the left from the region c2 is superimposed on the pressure dropping to the right from the region c2. Since the pressure level is, however, limited overall to the pump pressure, the pressure remains in practice constant between the regions c1 and c2. The full pump pressure can therefore be effective here. In a region c4, which adjoins the region c2 to the left, the pressure falls from pump pressure to the tank pressure, for example, linearly.

In FIG. 5, the same conditions are illustrated for a different angular position, for example along a line 16 according to FIG. 1. On the outside of the outer sliding member 4 the pressure ratios have not altered. On the inside of the outer sliding member 4, however, there is a lower pressure. The pressure there is only the pressure which is still able to pass from the two servo openings 8 on both sides of the line 16 up to the line 16. Furthermore, the pressure at the tank opening 9 is zero. The result is the pressure, indicated by a white area, produced by the servo openings 8. In the region c5, which corresponds to the tank opening 9, the pressure, as already mentioned, is zero. In the region c2, on the other hand, the pressure has remained at the full level of the pump pressure. Here too the pressure is distributed through the bore 10 to the pressure slot 12. The pressure drops linearly to zero in the region c3 to the left and in a region c6 to the right.

If the two FIGS. 4 and 5 are compared with one another, then it is clear that the contribution, shown by hatching, of the pressure slot 12 to the pressure build-up on the inside of the outer sliding member 4 is in practice constant over the entire circumference. Since equally the pressure on the outside of the outer sliding member 4 is constant over the entire circumference of the outer sliding member, the pressures on the outer sliding member from the inside and from the outside can be equalized by means of the pressure slot, irrespective of the relative angular position of the inner sliding member and the outer sliding member to one another.

We claim:

1. A hydraulic steering control unit of the type having a housing with an internal bore having axially spaced circumferential channels which are pump and tank channels and first and second alternately pressurized and depressurized control channels, said housing having external pump and tank and first and second control connections having respective fluid communication with said channels, said hydraulic steering control unit comprising,
a housing of said type which has an internal bore with one of said control channels formed therein.
an outer sliding member rotatably mounted in said housing internal bore having control openings in fluid communication with said one of said control channels,
an inner sliding member mounted in said outer sliding member for limited rotation relative thereto and having alternately arranged pressure and exhaust openings which are alternately and selectively brought into register with said outer sleeve member control opening to alternately and selectively pressurize and exhaust said one of said control channels via said pump and tank connections,
and said inner or outer sliding member having a circumferential pressure slot bordered by the other said member, passage means in said outer sliding member providing constant fluid communication between said slot and said one of said control channels to effect an equalization of pressure on the inner and outer surface of said outer sliding member in the vicinity of said one of said control channels.

2. A hydraulic steering control unit according to claim 11 wherein said circumferential pressure slot is formed in said inner sliding member and is axially spaced from said one of said control channels.

3. A hydraulic steering control unit according to claim 2 wherein said passage means includes a radially extending bore and an axially extending recessed slot in the surface of said outer member.

4. A hydraulic steering control unit according to claim 1 wherein said circumferential pressure slot is formed in said inner sliding member and is axially spaced from said one of said control channels, said inner sliding member having passage means to effect fluid communication between said circumferential pressure slot and said one of said control channels.

5. A hydraulic steering control unit according to claim 4 wherein said passage means includes at least one axially extending channel in the external surface of said inner sliding member.

6. A hydraulic steering control unit according to claim 5 including a plurality of circumferentially spaced channels differing in number from said control openings which are varyingly offset circumferentially relative to said control openings so that for every angular position of said inner sliding member relative to said outer sliding member at least one of said axially extending channels circumferentially overlaps one of said control openings.

* * * * *